US011853579B2

(12) United States Patent
Ahmad et al.

(10) Patent No.: US 11,853,579 B2
(45) Date of Patent: *Dec. 26, 2023

(54) SYSTEMS AND METHODS FOR PROVIDING CUSTOMER SERVICE FUNCTIONALITY DURING PORTFOLIO MIGRATION DOWNTIME

(71) Applicant: Capital One Services, LLC, McLean, VA (US)

(72) Inventors: Faizan Ahmad, Hoffman Estates, IL (US); Shahnawaz Ali, Palatine, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 64 days.

This patent is subject to a terminal disclaimer.

(21) Appl. No.: 17/719,404

(22) Filed: Apr. 13, 2022

(65) Prior Publication Data

US 2022/0244879 A1 Aug. 4, 2022

Related U.S. Application Data

(63) Continuation of application No. 16/600,882, filed on Oct. 14, 2019, now Pat. No. 11,334,271, which is a continuation of application No. 15/665,047, filed on Jul. 31, 2017, now Pat. No. 10,481,822.

(51) Int. Cl.
*G06F 3/06* (2006.01)

(52) U.S. Cl.
CPC ............ *G06F 3/0647* (2013.01); *G06F 3/065* (2013.01); *G06F 3/067* (2013.01); *G06F 3/0617* (2013.01); *G06F 3/0619* (2013.01)

(58) Field of Classification Search
CPC ............................. G06F 3/0647; G06F 3/0617
See application file for complete search history.

(56) References Cited

U.S. PATENT DOCUMENTS

| 7,584,131 B1 | 9/2009 | Kurtz et al. |
| 10,484,297 B1 | 11/2019 | McClenahan |
| 2005/0210320 A1 | 9/2005 | Vincent |

(Continued)

OTHER PUBLICATIONS

Mainframe. (2001). In F. Hargrave, Hargrave's Communications Dictionary, Wiley. Wiley. Credo Reference: https://search.credoreference.com/content/entry/hargravecomms/mainframe/0?institutionId=743 (Year: 2001).*

*Primary Examiner* — Khoa D Doan
*Assistant Examiner* — Marwan Ayash
(74) *Attorney, Agent, or Firm* — TROUTMAN PEPPER HAMILTON SANDERS LLP; Christopher J. Forstner; John A. Morrissett (57) ABSTRACT

A system includes one or more memory devices storing instructions, and one or more processors configured to execute the instructions to perform steps of a method for providing customer data access during a migration process. The system may initiate a transfer of customer data from a source data server to a system platform and transfer a subset of the customer data to a temporary data storage. The system may modify the temporary copy of customer data and generate an instruction to modify the permanent copy of customer data. In response to the completion of the transfer of customer data from the source data server to the system mainframe, the system may then transfer and execute the instruction to modify the permanent copy of customer data.

20 Claims, 3 Drawing Sheets

(56) References Cited

U.S. PATENT DOCUMENTS

| | | |
|---|---|---|
| 2006/0026012 A1 | 2/2006 | Campbell |
| 2006/0212481 A1 | 9/2006 | Stacey et al. |
| 2008/0104343 A1 | 5/2008 | Miyagaki et al. |
| 2009/0228525 A1 | 9/2009 | Fridrich |
| 2010/0070978 A1 | 3/2010 | Chawla et al. |
| 2014/0297979 A1 | 10/2014 | Baron et al. |
| 2015/0026127 A1 | 1/2015 | Zachrisen et al. |
| 2015/0178014 A1 | 6/2015 | Nelson |
| 2016/0103675 A1 | 4/2016 | Abaye et al. |
| 2017/0289115 A1 | 10/2017 | Lessiak et al. |
| 2018/0074748 A1 | 3/2018 | Makin et al. |
| 2018/0183578 A1 | 6/2018 | Chakrabarti et al. |
| 2019/0171514 A1 | 6/2019 | Chowdhury |

\* cited by examiner

SYSTEMS AND METHODS FOR PROVIDING CUSTOMER SERVICE FUNCTIONALITY DURING PORTFOLIO MIGRATION DOWNTIME

CROSS REFERENCE TO RELATED APPLICATION

This application is a continuation of, and claims priority under 35 U.S.C. § 120 to, U.S. patent application Ser. No. 16/600,882, filed Oct. 14, 2019, which is a continuation of U.S. patent application Ser. No. 15/665,047, now U.S. Pat. No. 10,481,822, filed Jul. 31, 2017, the entire contents of which are fully incorporated herein by reference.

FIELD OF INVENTION

The present disclosure relates to systems and methods for providing customer data access, and more particularly providing systems and methods for enabling customer service representatives to access and modify a subset of customer information during a data migration process.

BACKGROUND

Businesses often have their own software platforms for storing, accessing, and manipulating data, such as customer data. If a business acquires another business or otherwise acquires a large amount of data that needs to be migrated into the platform, the process of migrating the data may render the underlying data that is being migrated unable to be accessed or modified during the migration period. In many cases, the migration period may be lengthy. For example, it may not be uncommon for such a data migration to take as long as 48 to 72 hours. This poses a problem for organizations that need to access and modify that data during the migration period. For example, a financial service provider that maintains a large volume of customer financial account information may receive calls or other inquiries from customers wanting to modify their information by, for example, updating their phone number or address. In addition to data migration processes, data may also be inaccessible during system upgrade downtime, system outages, or system maintenance.

To address this problem, one approach is to have customer service representatives field these requests during the migration period, write down each requested modification to customer data on a form, and then manually update each record after the data migration has been completed based on the forms. However, this approach is very labor intensive process and poses a risk of human error in recording or updating the customer data modifications.

Accordingly, there is a need for improved systems and methods to provide customer data access that allow a customer service representative to access, view, and modify customer information during a data migration process. Embodiments of the present disclosure are directed to this and other considerations.

SUMMARY

Disclosed embodiments provide systems and methods for providing customer data access during a data migration process.

Consistent with the disclosed embodiments, the system may include one or more memory devices storing instructions, and one or more processors configured to execute the instructions to perform steps of a method of providing customer data access during a data migration process. The system may execute the instructions to initiate a transfer of customer data from a source data server to a system mainframe, where the transferred customer data may be a permanent copy of customer data. The system may transfer a subset of the customer data from the source data server to a temporary data storage, where the transferred subset of the customer data may be a temporary copy of customer data. The system may modify the temporary copy of customer data via a customer service representative terminal. Based on the modification of the temporary copy of customer data, the system may generate an instruction to modify the permanent copy of customer data. In response to the completion of the transfer of customer data from the source data server to the system mainframe, the system may transfer the instruction to modify the permanent copy of customer data to the system mainframe and modify the permanent copy of customer data.

Consistent with the disclosed embodiments, methods for providing customer data access during a data migration process are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing customer data access during a data migration process. The system may include one or more memory devices storing instructions, and one or more processors configured to execute the instructions to perform steps of a method. Specifically, in some embodiments, the system may execute the instructions to initiate a transfer of customer data from a source data server to a system mainframe, where the transferred customer data may be a permanent copy of customer data. The system may transfer a subset of the customer data from the source data server to a temporary data storage, where the transferred subset of the customer data may be a temporary copy of customer data. The system may modify the temporary copy of customer data via a customer service representative terminal. Based on the modification of the temporary copy of customer data, the system may generate an instruction to modify the permanent copy of customer data. In response to the completion of the transfer of customer data from the source data server to the system mainframe, the system may transfer the instruction to modify the permanent copy of customer data to the system mainframe and modify the permanent copy of customer data In another embodiment, a method for providing customer data access during a data migration process is disclosed. The method may include initiating a transfer of customer data from a source data server to a system mainframe, where the transferred customer data may be a permanent copy of customer data. The method may include transferring a subset of the customer data from the source data server to a temporary data storage, where the transferred subset of the customer data may be a temporary copy of customer data. The method may include modifying the temporary copy of customer data via a customer service representative terminal. Based on the modification of the temporary copy of customer data, the method may include generating an instruction to modify the permanent copy of customer data. In response to the completion of the transfer of customer data from the source data server to the system mainframe, the method may include transferring the instruction to modify the permanent copy of customer data to the system mainframe and modifying the permanent copy of customer data.

In another embodiment a non-transitory computer-readable medium storing instructions that, when executed by one or more processors, cause a system to initiate a transfer of customer data from a source data server to a system mainframe, where the transferred customer data may be a permanent copy of customer data. The system may transfer a subset of the customer data from the source data server to a temporary data storage, where the transferred subset of the customer data may be a temporary copy of customer data. The system may modify the temporary copy of customer data via a customer service representative terminal. Based on the modification of the temporary copy of customer data, the system may generate an instruction to modify the permanent copy of customer data. In response to the completion of the transfer of customer data from the source data server to the system mainframe, the system may transfer the instruction to modify the permanent copy of customer data to the system mainframe and modify the permanent copy of customer data.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
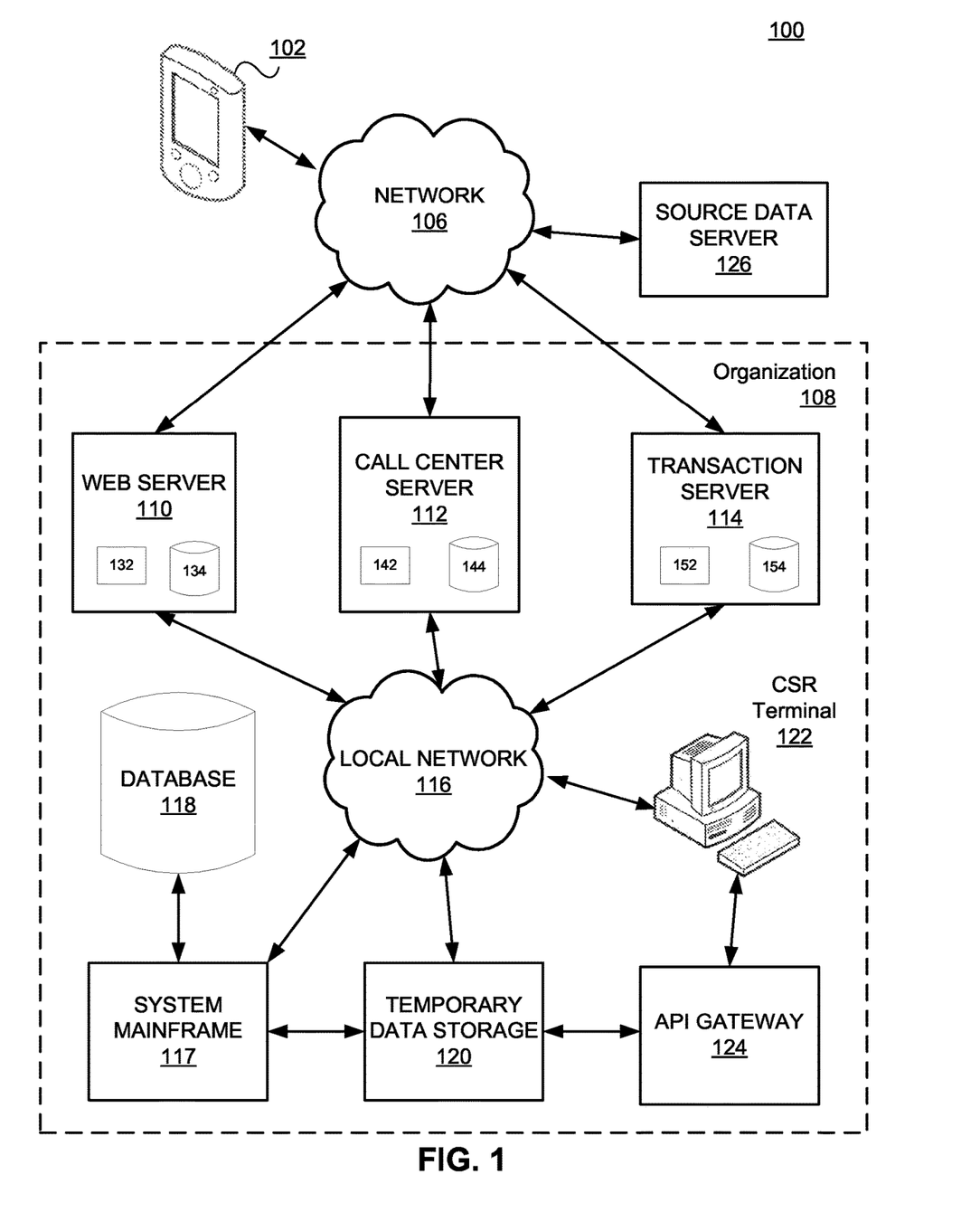
FIG. 1 is a diagram of an exemplary system that may be used to provide customer data access during a data migration process.

FIG. 1 is a diagram of an exemplary system 100 that may be configured to perform one or more processes that may provide customer data access during a data migration process. The components and arrangements shown in FIG. 1 are not intended to limit the disclosed embodiments as the components used to implement the disclosed processes and features may vary. As shown, system 100 may include a user device 102, a network 106, and an organization 108 including, for example, a web server 110, a call center server 112, a transaction server 114, a local network 116, a system mainframe 117, a database 118, a temporary data storage 120 a customer service representative (CSR) terminal 122, an API gateway 124, and a source data server 126.

In some embodiments, a customer may operate user device 102. User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108. In some embodiments, a user device may include or incorporate electronic communication devices for hearing or vision impaired users. User device 102 may belong to or be provided by a customer, or may be borrowed, rented, or shared. Customers may include individuals such as, for example, subscribers, clients, prospective clients, or customers of an entity associated with organization 108, such as individuals who have obtained, will obtain, or may obtain a product, service, or consultation from an entity associated with organization 108. According to some embodiments, user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other entity that provides one or more of goods, services, and consultations to individuals such as customers.

Organization 108 may include one or more servers, devices, and computer systems for performing one or more functions associated with products and/or services that organization 108 provides. Such servers, devices, and computer systems may include, for example, web server 110, call center server 112, transaction server 114, system mainframe 117, database 118, temporary data storage 120, CSR terminal 122 and API gateway 124, as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from a user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices of system 100. According to some embodiments, web server 110 may receive customer communication data, such as requests to access or modify customer information such as address, phone number, email address, and other such customer information. For example, customer communication data may be received by web server 110 as responses to chatbots in web-enabled chat applications, customer service representative instant messages, emails, or any other user input received via a mobile application on a user device 102.

Call center server 112 may include a computer system configured to receive, process, and route telephone calls and other electronic communications with a customer operating user device 102. Call center server 112 may have one or more processors 142 and one or more call center databases 144, which may be any suitable repository of call center data. Information stored in call center server 112 may be accessed (e.g., retrieved, updated, and added to) via local network 116 and/or network 106 by one or more devices of system 100. In some embodiments, call center server processor 142 may be used to implement an interactive voice response (IVR) system that interacts with the customer over the phone. In some embodiments, call center server may receive customer communication data such as requests to access or modify customer information such as address, phone number, email address, and other such customer information.

Transaction server 114 may include a computer system configured to process one or more transactions involving an account associated with a customer, or a request received from customers. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with organization 108 provides to individuals such as customers. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices of system 100.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 108 may communicate via network 106, without a separate local network 116.

System mainframe 117 may be one or more computing devices that host a computing platform for providing functionality utilized by an entity associated with organization 108 during, for example, executing its business operations. For example, system mainframe 117 may house a software platform that is used to permanently store and manipulate customer data. It should be understood that in this context, the term "permanently" does not mean that the data may not be moved or stored elsewhere, but rather it refers to an intention that system mainframe 117 will be the central repository of such data upon the data being migrated to organization 108 from other systems. For example, if an entity associated with organization 108 is a financial service provider, system mainframe 117 may include a platform that manages various credit card or financial account portfolios, and if the financial service provider acquires a new credit card or financial account portfolio, it may be required to migrate the data associated with the new credit card or financial account portfolio to system mainframe 117, and system mainframe 117 will store and manage the new credit card or financial account portfolio for as long as the portfolio remains with the financial service provider.

According to some embodiments, database 118 may be a database associated with organization 108 and/or its related entity that may store a variety of information relating to customers, transactions, customer information, and business operations. Database 118 may also serve as a back-up storage device and may contain data and information that is also stored on, for example, local databases associated with web server 110, call center server 112, transaction server 114, system mainframe 117, temporary data storage 120, CSR terminal 122, or API gateway 124. Database 118 may be accessed by other devices and may be used to store records of every interaction, communication, and/or transaction a particular customer has had with organization 108 and/or its related entity.

Temporary data storage 120 may include any device or software that is capable of temporarily storing customer data in a manner that allows the data to be accessed and modified. For example, in some embodiments, temporary data storage 120 may be a cloud storage service, such as Amazon Web Services™ (AWS), a mainframe, or an on-premise data storage device. In some embodiments, temporary data storage 120 may have the capability of creating custom databases to store incoming data. In some embodiments, temporary data storage 120 may include multiple database instances that provide redundancy and enhanced performance. Temporary data storage 120 may include auto scaling capabilities that enable the storage capacity of temporary data storage 120 to be modified and to automatically increase the number of database instances being run by temporary data storage 120 to maintain performance during spikes and to decrease capacity during lulls in data usage. Accordingly, the use of cloud storage services as temporary data storage 120 may enable the storage of temporary customer data to be flexible and efficient. Although FIG. 1 depicts temporary data storage 120 as being a part of organization 108, it should be understood that in some embodiments temporary data storage 120 may be external or remote to organization 108.

CSR terminal 122 may include, but is not limited to, a terminal, a desktop computer, a laptop computer, a mobile device such as a smart phone or tablet device, and any other computerized devices configured to communicate with local network 116 to perform various functions relating to organization 108 such as, for example, receiving telephone calls and conducting teleconferences with customer, engaging in written conversations with customers using a chat, instant messaging, or email program, accessing, viewing, and/or modifying customer data stored on temporary data storage 120 or system mainframe 117, and any other functions associated with organization 108's products or services including analyzing individuals' data, placing orders, cancelling orders, issuing credits and refunds, processing withdrawals, deposits, and transfers, and other functions relating to products, services, or accounts associated with customer. CSR terminal may include a graphical user interface (GUI) that enables a customer service representative to view and input changes to customer data. In some embodiments, an API gateway 124 may provide an API functionality that allows CSR terminal 122 to access and modify temporary customer data on temporary data storage 120 and/or system mainframe 117.

An employee may operate CSR terminal 122, and the employee may comprise any individual employed by organization 108 or involved in the operations of organization 108 including, for example, a customer service agent, an account manager, a product or service manager, a clerk, etc. Additionally, in some embodiments organization 108 may comprise a plurality of CSR terminals 122 and employees, and various CSR terminals 122 may serve varying functions for organization 108. As an example, a first CSR terminal 122 may provide call center functions for an employee performing the duties of a customer service representative, by, for example holding voice conversations with a customer via call center server 112 (e.g., via voice-over-IP) or written conversations with a customer via web server 110 (e.g., via a chat program). As another example, a second CSR terminal 122 may provide data analytic functions for an employee performing the duties of a data analyst. In both examples, the CSR terminals 122 may access individuals' customer data stored in temporary data storage 120 and/or system mainframe 117. Customer data may be any data that relates to a customer or customer account, such as, for example but not limited to, names, addresses, contact information, account information, card numbers, balances, account settings, account restrictions, and memos associated with an account.

API gateway 124 may be a device that includes one or more application programming interfaces (APIs) to implement some or all of the functionality associated with accessing, displaying, and/or modifying customer information, account information, transaction information, and any other data that may be used in the course of conducting the business of organization 108 and providing services to customers. For example, in some embodiments, API gateway 122 may include an API that enables CSR terminal 122 to access, view, and modify customer data stored in temporary data storage 120. In some embodiments, in response to a user input received by CSR terminal 122 representative of an instruction to modify temporary customer data stored in temporary data storage 120, an API may cause a modification to the temporary customer data stored in temporary data storage 120 and may also create an instruction to make the modification to the permanent data stored in system mainframe 117. It will be appreciated by those of skill in the art that although one or more APIs are described herein as residing on the API gateway, in various embodiments, APIs may reside on any number of other devices, such as for example, the web server 110, call center server 112, transaction server 114, user device 102, or CSR terminal 122. In some embodiments, APIs of the system 100 may enable operations such as address change, phone number update, e-mail id update, card blocking, card transfer, account blocking, memo update, and critical functions such as payment by phone. APIs of the system 100 may further include APIs that serve to validate account details provided by a customer, fetch customer account information for display, update customer information, and verify that the database is operating properly.

In certain embodiments, a real-time API consistent with certain disclosed embodiments may use Representational State Transfer (REST) style architecture, and in this scenario, the real time API may be called a RESTful API.

In certain embodiments, the real-time API may include a set of Hypertext Transfer Protocol (HTTP) request messages and a definition of the structure of response messages. In certain aspects, the API may allow a software application, which is written against the API and installed on a client (such as, for example, a CSR terminal 122) to exchange data with a server or other data storage device (such as, for example, temporary data storage 120 or system mainframe 117) that implements the API, in a request-response pattern. In certain embodiments, the request-response pattern defined by the API may be configured in a synchronous fashion, and require that the response be provided in real-time. In some embodiments, a response message from the server to the client through the API consistent with the disclosed embodiments may be in the format including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). Additionally or alternatively, the client may send GET and POST requests with JSON serialized parameters in the body. Preferably, the requests with JSON serialized parameters use "application/j son" content-type. In another aspect, the API design may also require the server implementing the API return messages in JSON format in response to the request calls from the client.

Source data server 126 may be any computing device, hardware, or software that stores the customer data prior to the customer data being transferred to system mainframe 117 or otherwise migrated into a software platform associated with organization 108. For example, in some embodiments, source data server 126 may be a cloud server that is external to organization 108. In some embodiments, source data server 126 may be a data server or mainframe that is internal to organization 108.

Although the preceding description describes various functions of a web server 110, call center server 112, transaction server 114, system mainframe 117, database 118, CSR terminal 122, and API gateway 124, in some embodiments, some or all of these functions may be carried out by a single computing device. For example, the all of the functions of web server 110, call center server 112, and transaction server 114 may be carried out by a single device.

For ease of discussion, embodiments may be described in connection with the of customer data access during a data migration process, and in particular, to customer data pertaining to credit card or financial account portfolios. It is to be understood, however, that disclosed embodiments are not limited to providing access to customer data, but rather the embodiments described herein may be applied to providing access to any type of data during a similar data migration process. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

Figure 2:
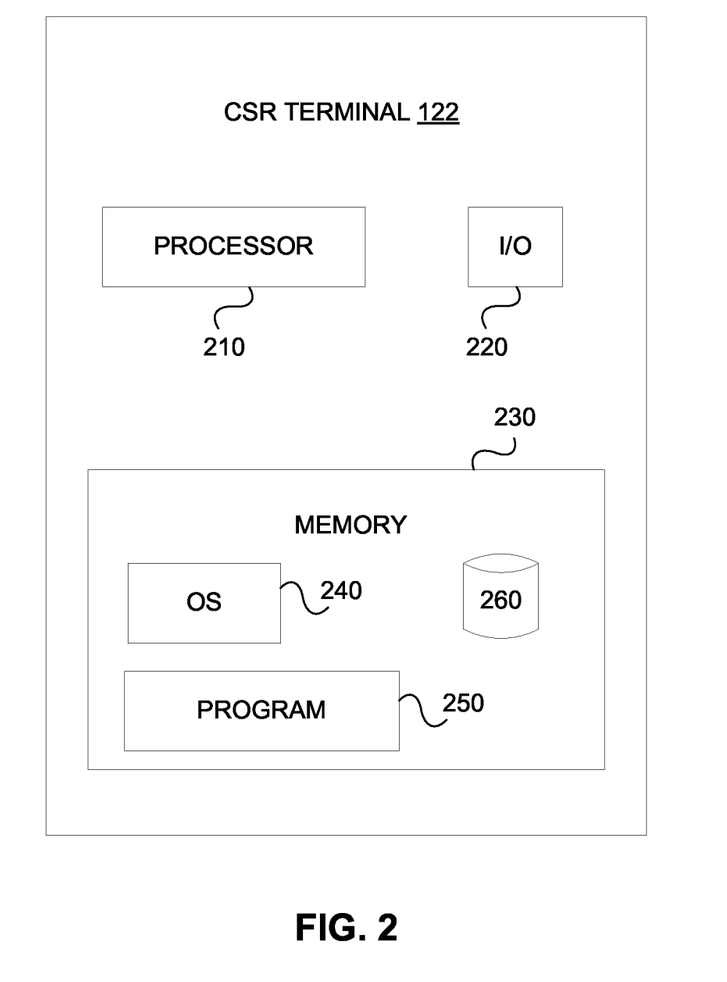
FIG. 2 is a component diagram of an exemplary customer service terminal.

An exemplary embodiment of CSR terminal 122 is shown in more detail in FIG. 2. Web server 110, call center server 112, transaction server 114, system mainframe 117, temporary data storage 122, API gateway 124, source data server 126 and/or user device 102 may have a similar structure and may include many components that are similar to or even have the same capabilities as those described with respect to CSR terminal 122. As shown, CSR terminal 122 may include a processor 210, an input/output ("I/O") device 220, a memory 230 containing an operating system ("OS") 240 and a program 250. For example, CSR terminal 122 may be a single device or server or may be configured as a distributed computer system including multiple servers, devices, or computers that interoperate to perform one or more of the processes and functionalities associated with the disclosed embodiments. In some embodiments, CSR terminal 122 may further include a peripheral interface, a transceiver, a mobile network interface in communication with the processor 210, a bus configured to facilitate communication between the various components of CSR terminal 122, and a power source configured to power one or more components of CSR terminal 122.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

CSR terminal 122 may include one or more storage devices configured to store information used by processor 210 (or other components) to perform certain functions related to the disclosed embodiments. In some embodiments, CSR terminal 122 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, CSR terminal 122 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, CSR terminal 122 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, CSR terminal 122 may include a program that when executed, generates a GUI that enables a user to view, access, and modify customer data stored in temporary data storage 120 and/or system mainframe 117.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable CSR terminal 122 to perform one or more of the processes and functionalities associated with the disclosed embodiments.

CSR terminal 122 may also be communicatively connected to one or more memory devices (e.g., databases) locally or through a network. The remote memory devices may be configured to store information and may be accessed and/or managed by CSR terminal 122. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases.

CSR terminal 122 may also include one or more I/O devices 220 that may comprise one or more interfaces for receiving signals or input from devices and providing signals or output to one or more devices that allow data to be received and/or transmitted by CSR terminal 122. For example, CSR terminal 122 may include interface components, which may provide interfaces to one or more input devices, such as one or more keyboards, mouse devices, touch screens, track pads, trackballs, scroll wheels, digital cameras, microphones, sensors, and the like, that enable CSR terminal 122 to receive data from one or more users.

In exemplary embodiments of the disclosed technology, CSR terminal 122 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While web server 110, call center server 112, transaction server 114, system mainframe 117, temporary storage 120, CSR terminal 122, API gateway 124, and source data server 126 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the web server 110, call center server 112, transaction server 114, system mainframe 117, temporary data storage 120, CSR terminal 122, API gateway 124, or source data server may include a greater or lesser number of components than those illustrated.

Figure 3:
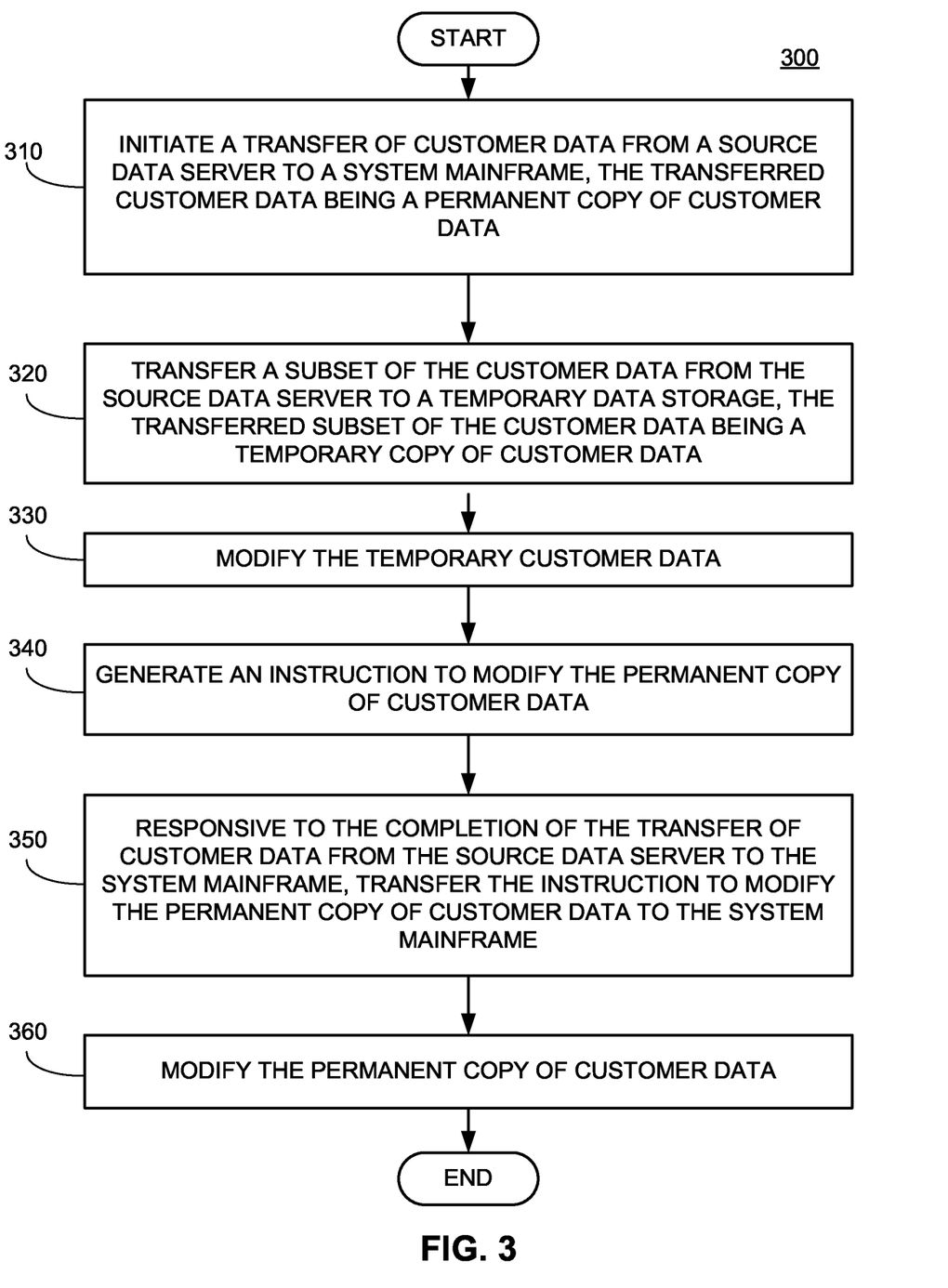
FIG. 3 is a flowchart of an exemplary method for providing customer data access during a data migration process.

FIG. 3 shows a flowchart of a method 300 for providing customer data access during a data migration process. Method 300 may be performed by some or all of web server 110, call center server 112, transaction server 114, system mainframe 117, database 118, temporary data storage 120, CSR terminal 122, and API gateway 124.

In block 310, the system (e.g., system 100) may initiate a transfer of customer data from source data server 126 to system mainframe 117. In some embodiments, a transfer may be initiated by a user from source data server 126 to system mainframe 117, using for example, Secured Copy Protocol (SCP). This transferred customer data may be referred to as being the permanent copy of customer data, which means that it represents the master copy or version of the customer data that is intended to be accessed and used by customer service agents in providing customer service functions in the future. However, because this permanent copy of customer data is inaccessible during the process of migrating it from the source data server 126 to the system mainframe 117, a temporary copy of a subset of the customer data is made as described below, so that customer service agents will be able to interact with the temporary copy while the permanent copy of customer data is being migrated to system mainframe 117 or is otherwise unavailable due to, for example, being integrated into a system platform of organization 108.

In block 320, system 100 may transfer a subset of the customer data from source data server 126 to temporary data storage 120. This transferred subset of the customer data may be referred to as being a temporary copy of customer data, as it is only intended to be used while the permanent copy of customer data is unavailable while it is undergoing a data migration process. Because it may not be necessary for customer service agents to access all of the customer data originating from source data server 126 in order to provide a minimum desired level of customer service functionality, a subset of the customer data may only need to be transferred to temporary data storage 120. For example, if the customer data comprises a plurality of records, and each record has a plurality of fields, when system 100 transfers the subset of the customer data to temporary data storage 120, it may transfer the plurality of records but it may first delete the fields of the plurality of records that are unnecessary in providing the desired level of customer service in order to reduce the amount of data that is transferred to temporary data storage 120.

In some embodiments, system 100 may transfer a subset of the customer data that includes data relating to certain account information, financial information, demographic information, card information, automatic payment information, and memos associated with a record. Account information may include, for example, whether an account is or has been blocked, account balances, credit limits payment delinquency information, and whether the account has any special status, such as VIP status. Financial information may include balance information, statement information, and billing cycle information. Demographic information may include a customer's name, address, phone number, business name, email address, date of birth, social security number, mother's maiden name, and other such personal identification information. Card information may include card numbers, expiration dates, security codes, cardholder name, authorization and blocking information, and other such card-related information. Automatic payment information may include one or more bank account numbers, routing numbers, bank account types, bank names, payment dates, authorization information, and other information related to enabling automatic payments. Memos or notes may include information that has been entered by customer service agents or otherwise that provide additional pertinent information relating to the customer and/or customer account. According to some embodiments, the specific types of information that are included in the subset of the customer data that is transferred to temporary data storage 120 may be specified by user input prior to the transfer. In some embodiments, the specific types of information that are included in the subset may be determined based on research that has been performed on the user experience during previous data migrations to identify elements and features that contribute to a satisfactory user experience. According to some embodiments, the specific types of information that may be included in the subset of customer data that is transferred to temporary data storage 120 may be changed or modified by an operator of system 100 in response to feedback relating to the customer experience received during subsequent data migrations.

According to some embodiments, before or during the transfer to temporary data storage 120, data conditioning techniques may be applied to the customer data and/or to the subset of the customer data. For example, in some embodiments, code (e.g., Java code) may be executed on temporary data storage 120, which may extract and format the source data from source data server 126 and upload the conditioned data as a temporary copy of customer data on the temporary data storage 120. In some embodiments, code may be executed on source data server 126 to extract and format the source data before uploading the temporary copy of customer data to temporary data storage 120. Data conditioning techniques may reduce the amount of storage space required to store the subset of the customer data. According to some embodiments, the temporary copy of customer data may require 10% or less storage space than the permanent copy of customer data due to the elimination of some of the data from the subset used to form the temporary copy combined with the data conditioning techniques applied to the subset. The temporary copy of customer data may be stored in one or more database instances generated by temporary data storage 120. As describe previously above, temporary data storage 120 may include auto scaling capabilities that may automatically increase or decrease the number of database instances to account for spikes and lulls in data usage.

In block 330, system 100 may modify the temporary copy of customer data. In some embodiments, CSR terminal 122 may access the temporary copy of customer data residing in temporary data storage 120 and make modifications to it. For example, a customer service representative operating a CSR terminal 122 may be interacting with a customer via web server 110 (e.g., engaging in instant messaging with a customer) or via call center server 112 (e.g., engaging in a voice call with a customer) and the customer may request information about their account or a modification to information related to their account, causing the customer service representative to need to access the temporary copy of customer data via CSR terminal 122.

In some embodiments, CSR terminal 122 may access the temporary copy of customer data on temporary data storage 120 via an API stored on CSR terminal 122. According to some embodiments, CSR terminal 122 may access the temporary copy of customer data on temporary data storage 120 by first connecting to API gateway 124 and utilizing an API stored on API gateway 124. CSR terminal 122 may include a GUI that may allow a customer service representative to view and interact with the temporary copy of customer data using CSR terminal 122. For example, the GUI may allow a customer service representative to pull up a customer's account and view and/or modify account information, financial information, demographic information, card information, automatic payment information, and memos associated with the customer's account. Thus, system 100 may enable a customer service agent to view and modify a limited amount (i.e., an amount corresponding to the subset of the customer data transferred to temporary data storage 120) of customer information to continue providing one or more customer service functionalities, such as accessing a customer account or profile by the customer's card number, phone number or social security number, customer verification, performing lost/stolen account transfer, card reissue, payment by phone, adding bank details for payments, processing address changes, phone number updates, email address updates, card blocking, account blocking, and memo updates, to customers while the customer data is being transferred to system mainframe 117 or being otherwise integrated into a platform of organization 108.

Further, according to some embodiments, in the course of modifying the temporary copy of customer data, system 100 may also generate a digital footprint that represents a record of one or more interactions with the temporary copy of customer data made by a CSR terminal 122. For example, a digital footprint may be a log of one or more actions that were taken, the time the action(s) were taken, and the user who took the action(s). Digital footprints may be utilized to identify a particular customer service agent or other user that made a modification to the temporary copy of customer data in order to provide a security check in the event of any irregularity. In some embodiments, digital footprints may be used to analyze customer service agent behavior to provide insights into future improvements that may be made to system 100. Further, the digital footprints may also enable software developers or IT staff to perform research to allow them to track the source of any problem of issue with the software.

In block 340, system 100 may generate an instruction to modify the permanent copy of the customer data in response to the modification of the temporary copy of customer data. For example, if in block 330, the temporary copy of customer data was modified to change a customer's address from "123 Main Street" to "45 Broad Street," then system 100 may generate an instruction to change the same customer's address from "123 Main Street" to "45 Broad Street" in the permanent copy of the customer data. Thus, an instruction to modify the permanent copy of customer data may represent an instruction to modify the permanent copy of data to mirror a modification made to the temporary copy of customer data. According to some embodiments, the instruction may be stored in temporary data storage 120, CSR terminal 122, or any other storage location of system 100. System 100 may generate a plurality of such instructions corresponding to each modification of the temporary copy of customer data made by customer service terminal 122. In some embodiments, a plurality of instructions may be aggregated into a single output file to be sent to system mainframe 117.

In block 350, system 100 may transfer the instruction(s) to modify the permanent copy of customer data (or the output file aggregating such instructions) to system mainframe 117 in response to the completion of the transfer of customer data from source data server 126 to system mainframe 117. For example, in some embodiments, when the transfer of customer data from source data server 126 to system mainframe 117 has been completed, system mainframe 117 and/or source data server 126 may send a message (e.g., via local network 116) to the device that is storing the instruction (e.g., temporary data storage 120, API gateway 124, or CSR terminal 122) to indicate that the transfer of customer data has been completed and in response to receiving the message, the device may then transfer the instruction (or plurality of instructions, if applicable) to system mainframe 117. According to some embodiments, in addition to transferring the instructions, the digital footprints may also be transferred to system mainframe 117 so that system mainframe 117 may maintain a record of who made the modifications to the customer data.

In block 360, system 100 may modify the permanent copy of customer data. For example, in response to receiving one or more instructions to modify the permanent copy of customer data, system mainframe 117 may execute the instruction(s) to modify the permanent copy of customer data. In some embodiments, system mainframe 117 may modify the permanent copy of customer data to mimic the modification of the temporary copy of customer data made in block 330. In some embodiments, after system mainframe 117 executes all of the instructions to modify the permanent copy of customer data, the temporary copy of customer data stored in temporary data storage 120 may be deleted.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not in limitation. A financial service provider, such as a credit card company, may acquire a new portfolio of credit card or accounts from another business and may need to integrate the new portfolio of credit card accounts into the platform used by the financial service provider to manage and administer the credit card services. Migrating the data into the financial service provider's platform (e.g., system mainframe 117) can be a lengthy process that may take 2-3 days, during which the data is inaccessible to customer service representatives.

In order to make certain aspects of the customer data accessible, the system (e.g., system 100) may create a copy of a subset of the customer data (e.g., stored in temporary data storage 120) that is made available to customer service representatives (e.g., via CSR terminal 122) for viewing and/or manipulation. Optionally, the copy of the subset of the customer data may be conditioned or otherwise modified so that it takes us less storage space in temporary data storage 120. Accordingly, if a customer service representative employed by or acting on behalf of the financial service provider receives a call (e.g. via call center server 112) or an online chat (e.g., via web server 110) from a customer, and the customer makes a request to change the address associated with their account, the customer service agent may utilize a graphical user interface (GUI) presented on a customer service terminal to access the temporary copy of the user's data and input a change of address. The system (e.g., via temporary data storage 120) can then modify the temporary copy of the customer data and create an instruction to mimic the change in the permanent copy of the customer data. Accordingly, when the new portfolio has finished migrating into the financial service provider's platform (e.g., from source data server 126 to system mainframe 117), the instructions may be executed (e.g., via system mainframe 117) to update the permanent copy of the customer data. In this way, the system provides seamless access to a portion of the customer data to allow customer service representatives to efficiently provide basic customer service functions without delay or the need to manually update the permanent copy of the customer data. Further, the system (e.g., via temporary data storage 120) may also provide a security function by creating and storing digital footprints that log which customer service agent made which changes to the customer data.

Another use case would be for providing a contingency in case of a system outage or customer service system disruption for reasons other than a portfolio migration. For example, the system (e.g., system 100) may cause create a copy of a subset of the customer data (e.g., stored in temporary data storage 120) that is capable of being made available to customer service representatives (e.g., via CSR terminal 122) for viewing and/or manipulation in a manner similar to that as previously described above in the event of an unexpected system outage. The system may create a copy of a subset of the customer data at predetermined intervals, such as, for example, once a week. For example, if the system is configured to create a copy of a subset of the customer data on Saturday, if there is an unexpected customer service system disruption on Wednesday, the system (e.g., system 100) may then give customer service representatives access to the copy of the subset of customer data to access and modify as previously described above. However, if after creating a copy of the subset of data on Saturday, there are no unexpected customer service system disruptions over the next week, then on the following Saturday, the first copy of the subset of customer data may be deleted and replaced with a new copy of the subset of the customer that includes all of the changes and updates that were made during the previous week. In this way, the system (e.g., system 100) may be used on a rolling basis to maintain an intermittently updated copy of a subset of the customer data that may be accessed and modified by customer service representatives in case of an unexpected system outage. Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

What is claimed is:

1. A method of providing customer data access during a data migration process, the method comprising:
   receiving first input associated with one or more previous data migration processes, wherein the first input is received prior to a start of a transfer process and indicates one or more types of information to include in a data subset that remains accessible during the transfer process;
   generating a temporary copy of the data subset, wherein the temporary copy is accessible during the transfer process;
   automatically determining, based on the temporary copy, a total number of one or more database instances of a temporary data storage necessary for managing the temporary copy during the transfer process;
   transferring the temporary copy from a data server to the temporary data storage;
   receiving second input associated with one or more subsequent data migration processes;
   modifying the temporary copy based on the second input; and
   transferring a permanent copy of data from the data server to a mainframe, the data comprising the data subset, and wherein the permanent copy is inaccessible during the transfer process.

2. The method of claim 1, wherein:
   the first input comprises user input, and
   the second input comprises user feedback.

3. The method of claim 1, further comprising:
   generating a set of instructions to modify the permanent copy based on any modifications to the temporary copy during the transfer process; and
   transferring the set of instructions to the mainframe upon completion of the transfer process of the permanent copy from the data server to the mainframe.

4. The method of claim 3, wherein:
   the modifications to the temporary copy during the transfer process comprise modifications made to the temporary copy by a customer service representative terminal, and
   the set of instructions include a record of a customer service representative who made the modifications and a log of associated actions.

5. The method of claim 3, wherein the modifications to the temporary copy are recorded in a digital footprint including a record of (i) users who made the modifications and (ii) associated actions for each user.

6. The method of claim 1, wherein modifying the temporary copy during the transfer process comprises receiving a user input to modify a piece of customer information via a graphical user interface (GUI) displayed on a customer service representative terminal.

7. The method of claim 1, wherein the temporary copy requires 10% or less of storage space used by the permanent copy.

8. The method of claim 1, wherein generating the temporary copy includes applying data conditioning techniques to the temporary copy to reduce storage space used by the temporary copy.

9. A system for providing customer data access during a data migration process, the system comprising:
one or more processors; and
a memory in communication with the one or more processors and storing instructions that, when executed by the one or more processors, are configured to cause the system to:
receive first input associated with one or more previous data migration processes, wherein the first input is received prior to a start of a transfer process and indicates one or more types of information to include in a data subset that remains accessible during the transfer process;
generate a temporary copy of the data subset, wherein the temporary copy is accessibly during the transfer process;
automatically determine, based on the temporary copy, a total number of one or more database instances of a temporary data storage necessary for managing the temporary copy during the transfer process;
receive second input associated with one or more subsequent data migration processes;
modify the temporary copy based on the second input;
transfer a permanent copy of data to a mainframe, the data comprising the data subset, and wherein the permanent copy is inaccessible during the transfer process; and
transfer a set of instructions to the mainframe upon completion of the transfer process of the permanent copy, the set of instructions comprising any modifications to the temporary copy made during the transfer process.

10. The system of claim 9, wherein the instructions are further configured to cause the system to:
receive a digital footprint from the temporary data storage, the digital footprint comprising the modifications to the temporary copy made during the transfer process.

11. The system of claim 10, wherein the digital footprint includes a record of (i) users who made the modifications and (ii) associated actions for each user.

12. The system of claim 9, wherein the modifications to the temporary copy during the transfer process comprise modifications made to the temporary copy by a customer service representative terminal.

13. The system of claim 9, wherein the modifications to the temporary copy during the transfer process comprise modifications to one or more of a name, a mailing address, an email address, or a phone number.

14. The system of claim 9, wherein the temporary copy is from 1% to 10% of the permanent copy, and wherein generating the temporary copy includes applying data conditioning techniques to the temporary copy to reduce storage space used by the temporary copy.

15. The system of claim 9, wherein the permanent copy is modified by the mainframe based on the instructions.

16. A system for providing data access during a data migration process, the system comprising:
a data server;
a temporary data storage; and
a mainframe;
the system configured to:
receive, prior to a start of a transfer process, first input indicating one or more types of information to include in a data subset that remains accessible during the transfer process;
generate, with the data server, a temporary copy of the data subset;
automatically determine, based on the temporary copy, a total number of one or more database instances of the temporary data storage necessary for managing the temporary copy during the transfer process;
transfer the temporary copy from the data server to the temporary data storage, wherein the temporary copy is accessible during the transfer process;
receive second input associated with one or more subsequent data migration processes;
modify the temporary copy based on the second input; and
initiate, with the data server, a transfer of a permanent copy of data from the data server to the mainframe, the data comprising the data subset, and wherein the permanent copy is inaccessible during the transfer process.

17. The system of claim 16, further comprising:
a customer service representative (CSR) terminal;
the system further configured to:
send, from the CSR terminal, a first instruction to modify the permanent copy upon completion of transfer of the permanent copy from the data server to the mainframe; and
store, at the temporary data storage, the first instruction.

18. The system of claim 17, wherein the CSR terminal can view and modify only a limited amount of information included in the temporary copy.

19. The system of claim 18, wherein the CSR terminal can change a customer's phone number, mailing address, and/or e-mail address; report an account lost or stolen; or reissue a card.

20. The system of claim 16, wherein the one or more types of information comprise one or more of account information, financial information, demographic information, card information, automatic payment information, one or more memos associated with a record, or combinations thereof.

* * * * *